M. C. RUSSELL.
EGG-BEATER.

No. 187,417. Patented Feb. 13, 1877.

Witnesses

Inventor
Matthew C. Russell
per
George H. Eels
Attorney

UNITED STATES PATENT OFFICE.

MATTHEW C. RUSSELL, OF DEPOSIT, NEW YORK, ASSIGNOR OF ONE-HALF HIS RIGHT TO WILLIAM R. WILCOX, OF SAME PLACE.

IMPROVEMENT IN EGG-BEATERS.

Specification forming part of Letters Patent No. 187,417, dated February 13, 1877; application filed January 5, 1877.

*To all whom it may concern:*

Be it known that I, MATTHEW C. RUSSELL, of the village of Deposit, in the county of Broome and State of New York, have invented a new and useful Improvement in Egg-Beaters, which improvement is fully set forth in the following specification, reference being had to the accompanying drawings, in which like parts are indicated by the same letters.

The object of my invention is to secure the rapid and thorough beating or aeration of a small or large quantity of egg, with the avoidance of all external spatter, and with a simplicity of construction which will allow the beater to be readily cleaned.

Figure 1:
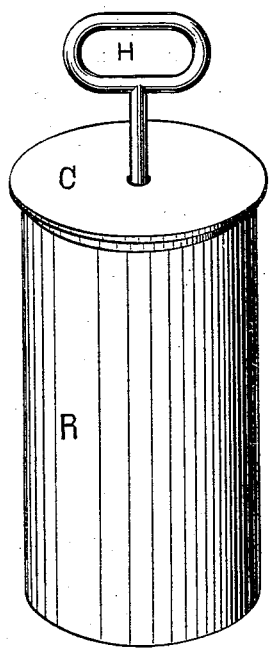

Figure 1 of the drawings represents, in perspective, one of my egg-beaters complete. H is the handle of the reciprocating dasher or beater, passing through the closely-fitting cover C, and R is the egg chamber or receiver.

Figure 2:
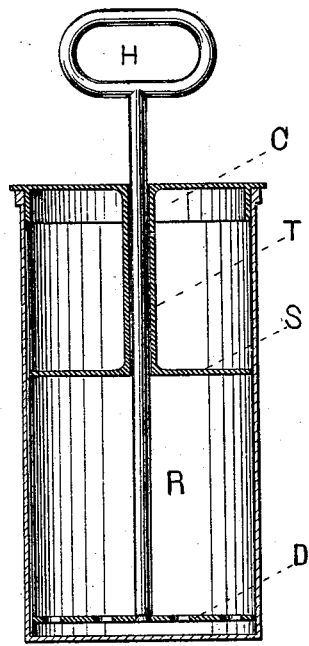

Fig. 2 represents a central vertical section of the egg-beater, and shows clearly the construction by which the object in view—and before mentioned—is attained. D is a closely-fitting, flat, perforated dasher or beater, fixed to the reciprocating handle H. S is a flat, closely-fitting piece or shield, of about the same size and shape as the dasher or beater, but with no perforations, and permanently attached to the cover C by means of the tube T, through which tube the reciprocating handle H freely passes. The shield S is generally placed a little above the center of the receiver.

It will be seen that when the beater is in operation all of the egg—no matter how small or great the quantity—by the downward movement of the flat dasher D, is forced upward and against the shield S, which shield prevents the jets of egg from reaching the under side of the cover C. The long tube T, closely fitting around the handle H, also prevents the egg from reaching the outside of the cover. Upon the upward movement of the dasher or beater, the shield S prevents the egg from being thrown up against the cover C, and also assists the air in forcing all of the egg through the perforations, and below the beater or dasher D. Practically, all of the egg is retained between the shield S and the bottom of the receiver, and the beater or dasher D may be forced through this mass at a very high speed, quickly aerating the egg.

Figure 3:
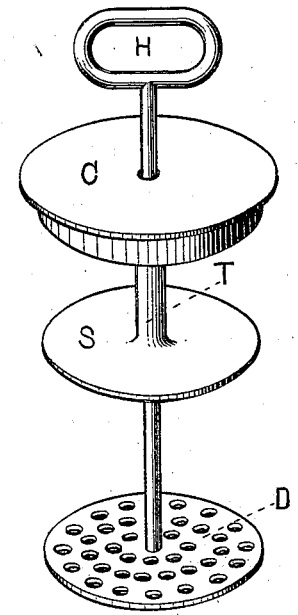

Fig. 3, which represents, in perspective, the cover, connecting-tube, shield, and dasher all detached from the receiver R, will convince as to the ease with which the egg-beater may be cleaned.

I am aware that plane and concave dashers are used in egg-beaters and churns, also dashers consisting of hollow perforated frustums of cones. The former are uncleanly and inefficient; the last are difficult to clean, and will not necessarily beat all the egg, owing to their shape.

I claim as new and desire to secure by Letters Patent—

The combination, in a reciprocating egg-beater, substantially as described, of a cover, connecting-tube, and shield.

MATTHEW C. RUSSELL.

Witnesses:
W. R. WILCOX,
R. H. MAPES.